United States Patent [19]

Harbert et al.

[11] 4,057,761
[45] Nov. 8, 1977

[54] RECEIVED SIGNAL SELECTING SYSTEM WITH PRIORITY CONTROL

[75] Inventors: Donald Duane Harbert, Prosperity; Ronald Gilbert Ferrie, Pittsburgh, both of Pa.

[73] Assignee: RCA Corporation, New York, N.Y.

[21] Appl. No.: 645,338

[22] Filed: Dec. 30, 1975

[51] Int. Cl.$^2$ .............................................. H04B 1/10
[52] U.S. Cl. ..................................... 328/154; 325/56; 325/304; 325/402
[58] Field of Search ................... 328/152, 154; 325/54, 325/55, 56, 304, 402

[56] References Cited
U.S. PATENT DOCUMENTS

| | | | |
|---|---|---|---|
| 3,403,341 | 9/1968 | Munch | 325/304 X |
| 3,522,449 | 8/1970 | McMurtrie | 328/154 X |
| 3,693,088 | 9/1972 | Rustako et al. | 325/56 |
| 3,729,681 | 4/1973 | Elder | 325/304 |
| 3,729,682 | 4/1973 | Elder | 325/304 |
| 3,984,776 | 10/1976 | Stedman | 325/304 X |
| 4,013,962 | 3/1977 | Beske et al. | 325/304 |

Primary Examiner—John S. Heyman

Attorney, Agent, or Firm—Edward J. Norton; Robert L. Troike

[57] ABSTRACT

A system, which selects the most desired signal from similar signals provided by two or more radio receivers, includes a separate arrangement of a signal quality detector, a signal selection gate, and a comparison circuit for each of the similar signals. Each detector provides an output signal level indicative of the quality of the particular one of the similar signals to which it is responsive. The comparison circuits determine from the various detector output signal levels the better signal among the similar signals and provide a control signal to the selection gate in the arrangement including the detector indicating the better signal. The selection gate in the arrangement responsive to the better signal in response to the control signal passes the better signal out of the system. A priority bus is common to all of the above-mentioned arrangements responsive to the respective similar signals. An activity signal is provided on the bus in response to the presence of a control signal to one of the selection gates. Each of the above-mentioned arrangements also includes a priority device coupled to the selection gate and arranged to determine the status of the selection gate in response to the presence of the activity signal on the bus.

3 Claims, 9 Drawing Figures

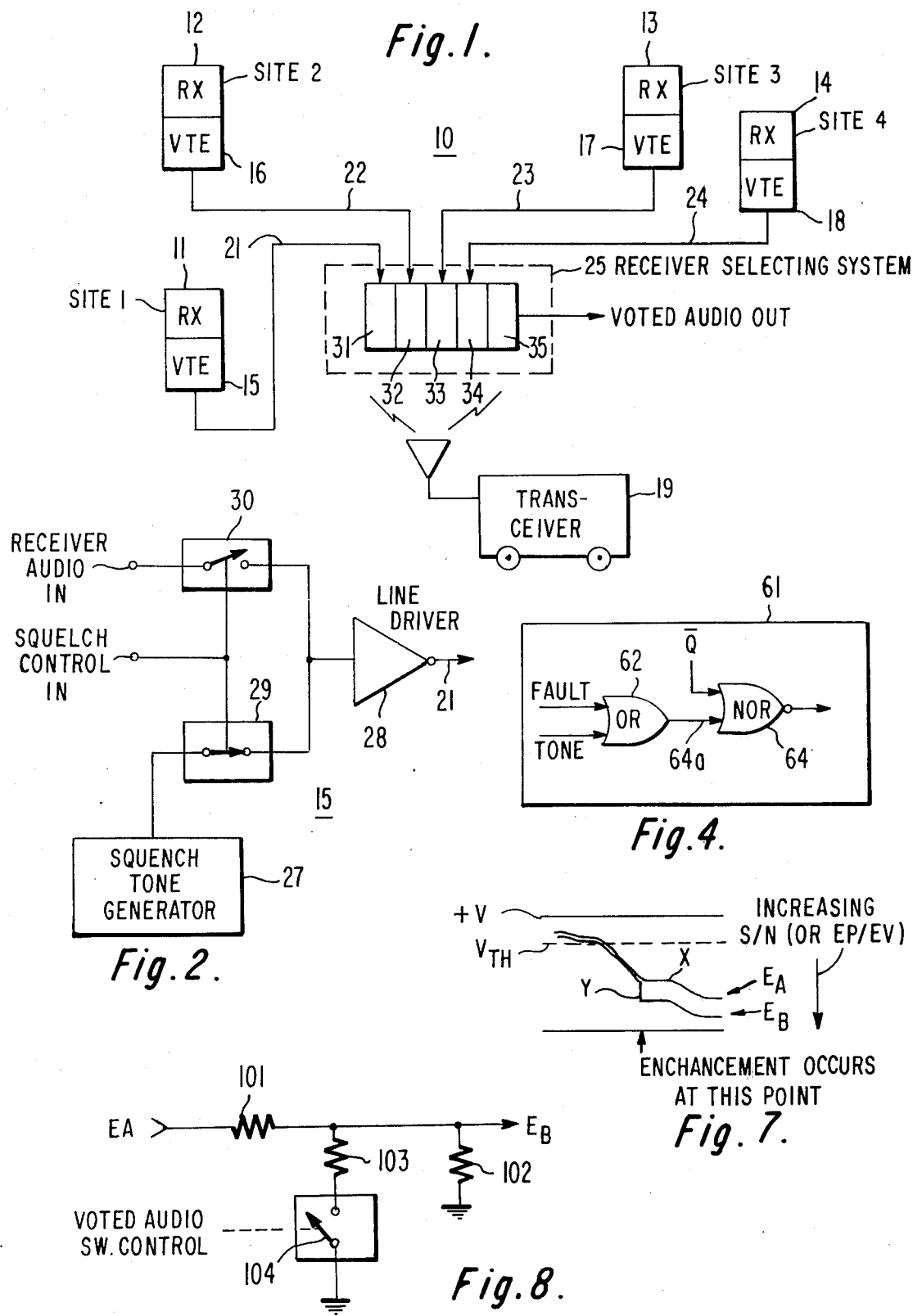

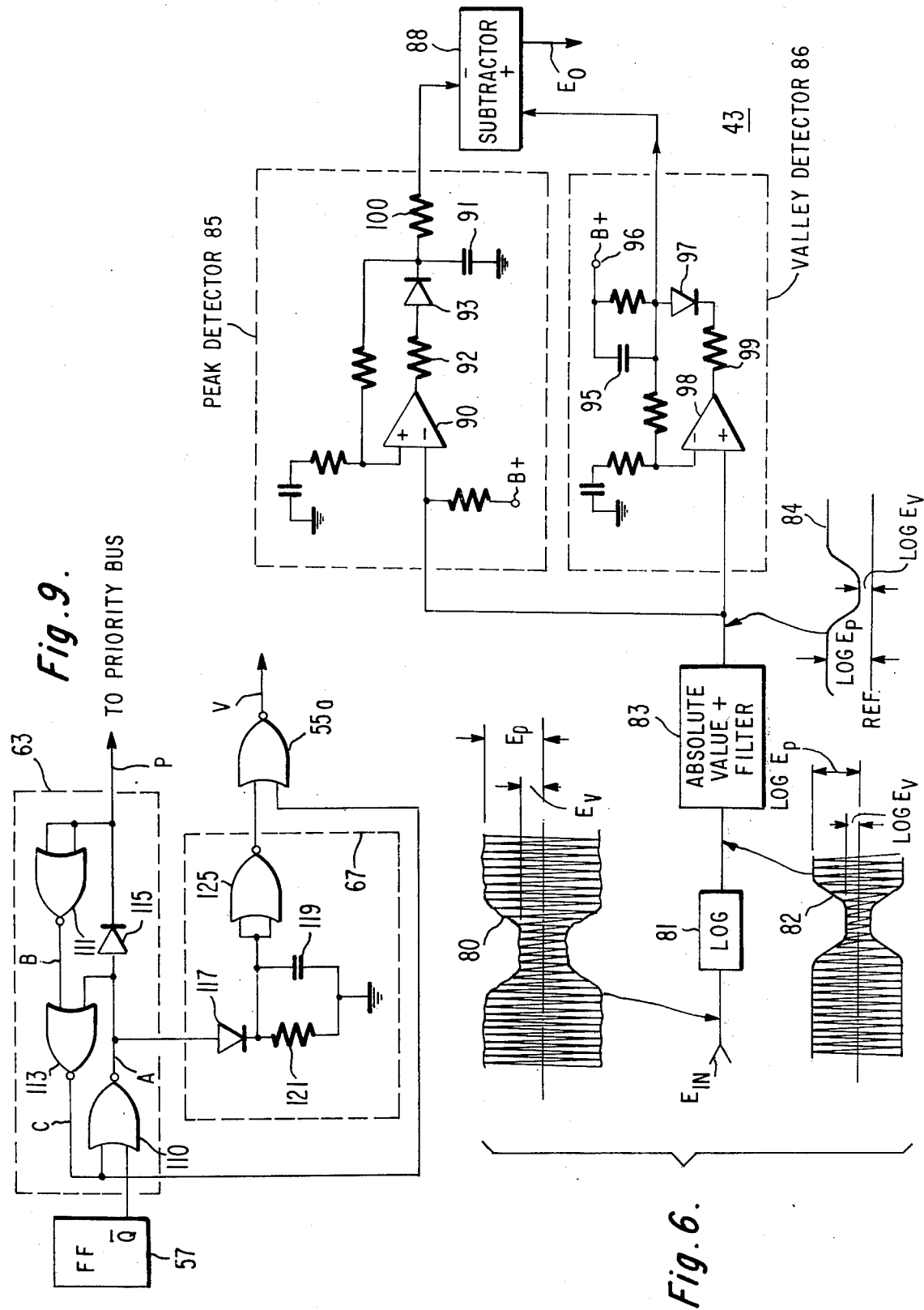

RECEIVED SIGNAL SELECTING SYSTEM WITH PRIORITY CONTROL

BACKGROUND OF INVENTION

This invention relates to an improved receiver selecting system and, particularly, to a system for selecting from a plurality of receivers the one receiver which provides the highest quality signal.

In mobile communication systems, the talk back range of the mobile or portable transceiver is limited because of the output power capabilities. The talk back range can be extended by placing additional receivers in strategic locations, so that during transmission from a portable or mobile unit from any location in the expected coverage area, at least one receiver will receive a signal of sufficient strength to effectively communicate to the dispatcher or main station. In the majority of cases, an acceptable signal will be present at more than one of these satellite receivers.

The audio from each satellite receiver is generally transmitted over telephone lines to a central location where electronic hardware is used to determine which receiver has the best quality audio which is then fed to a common output. The system by which the selection of the best quality signal from a number of inputs is provided, as described above, is referred to herein as the receiver selecting system. This type of system is sometimes known as "receiver voting." To further complicate matters, the signal to noise (S/N) ratio from a particular satellite receiver can change dramatically from the best choice to one that is un-acceptable during a signal transmission due to "Rayleigh fading." The fading rate is determined by the channel frequency and the relative motion between the transmitting and receiving antennas. In the 900 MHz band, the fading rate can approach 10 milliseconds.

Systems or arrangements for selecting the best signal from a plurality of radio receivers are known in the prior art, as exemplified by U.S. Pat. Nos. 3,403,341; 3,495,175 and 3,729,681. The prior art systems have various disadvantages, some of which are: a selecting arrangement which makes irrevocable selection at the beginning of a radio transmission, even though the selected receiver may subsequently provide a poor signal; a selecting arrangement which uses signals indicated by audible tones which are coded to indicate the best signal, but which must be filtered to avoid interference; a selecting arranfement which is relatively slow in operation so that some signals may be lost; a selecting arrangement in which a weak signal with excellent signal-over-noise is excluded in favor of a strong signal with poor quality; and a selecting arrangement which, although giving good indications of the best received signal, is relatively complex.

BRIEF DESCRIPTION OF INVENTION

Briefly, signal quality detector means provides a separate control signal having a level indicative of the quality for each of a plurality of signals. Comparison means determines in response to the control signals which of the plurality of signals is the better signal. A separate selection gate is responsive to each of the plurality of signals. The comparison means functions to operate that selection gate responsive to the particular one of the plurality of signals determined to be the better signal to pass that one of the plurality of signals to a utilization circuit. Means are provided responsive to the operation of one of the selection gates by the comparison means to generate an activity signal. A separate priority device is coupled to each selection gate to control the operation of the respective selection gates in response to the activity signal.

DESCRIPTION OF DRAWINGS

A more detailed description follows in conjunction with the following drawings wherein:

FIG. 1 is a block diagram of a basic communication system using a selective receiver system.

FIG. 2 is a diagram of the voting tone encoder system.

FIG. 4 is a logic diagram of the selection output logic device in the selective receiver system of FIG. 3.

FIG. 6 is a block diagram of the S/N quality evaluator of FIG. 3.

FIG. 7 is a sketch of the voltage from the output of the S/N evaluator and S/N enhancement of FIG. 3.

FIG. 8 is a schematic diagram of the S/N enhancement of FIG. 3.

FIG. 9 is a logic diagram of the priority logic and delay off timer of FIG. 3.

DESCRIPTION OF PREFERRED EMBODIMENT

Figure 3:
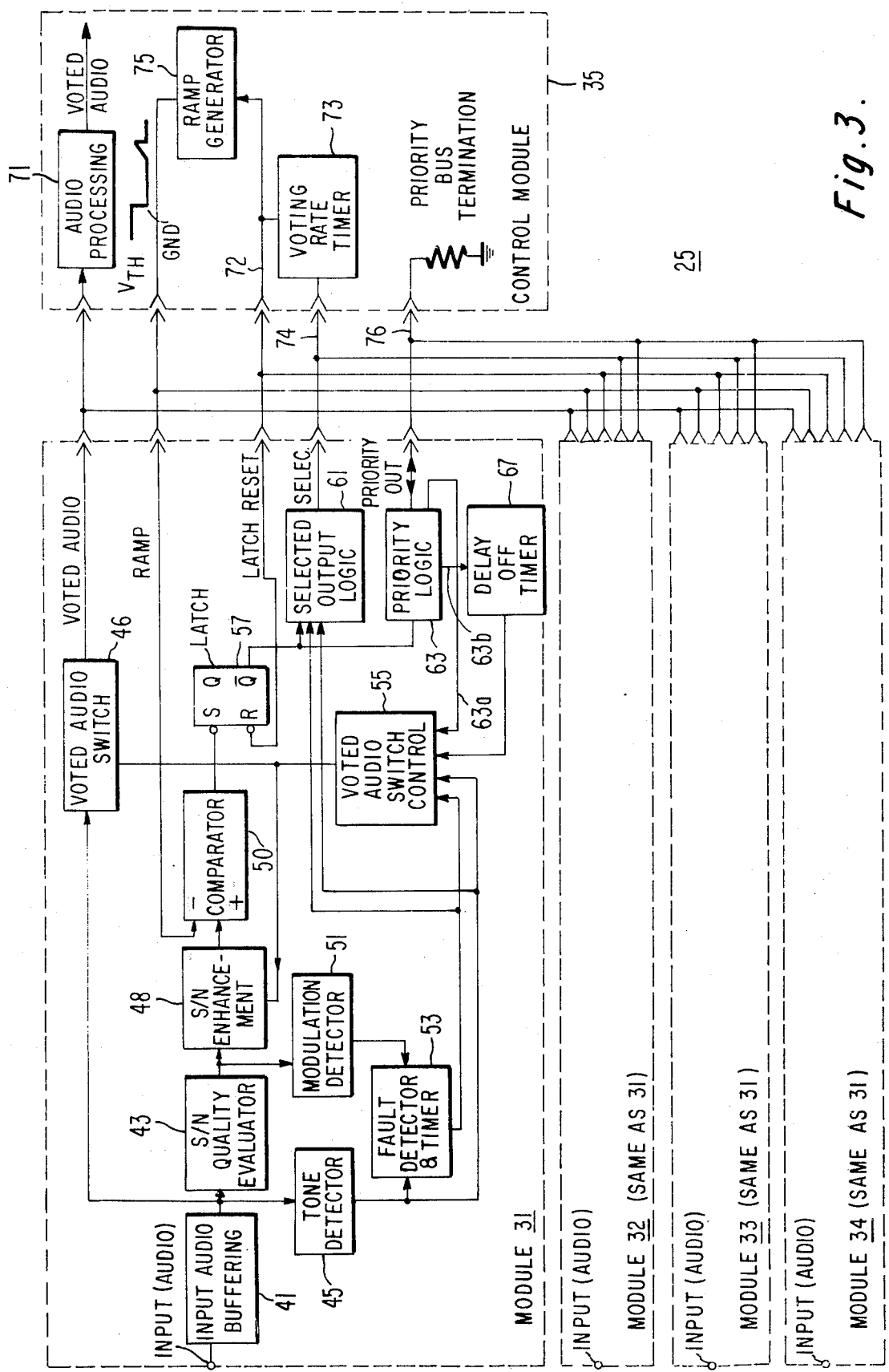
FIG. 3 is a block diagram of a selective receiver system.

Referring to FIG. 1, there is illustrated a block diagram of a basic communications system. The system 10 includes, for example, four fixed location receivers 11, 12, 13 and 14, scattered at different sites 1 thru 4. These sites may be located at the center of four sectors of a small city. A relatively low powered transportable transceiver 19 located on a person or car transmits low powered electromagnetic waves. These transmitted waves may be in response to a message it receives from a base station located somewhere in the city. The receivers 11, 12, 13 and 14 are adapted to receive an electromagnetic wave emitted from transceiver 19. The quality of the signal received at each remote site changes with changes in the relative position of the transceiver 19 to the remote sites 1 thru 4. The output of each receiver is coupled, for example, by telephone lines 21, 22, 23 and 24 to a receiver selecting system 25. The receiver selecting system 25 may be at a base station location. The coupling from remote sites to the receiver selecting system 25 may also be provided by a microwave relay network. The output of the respective receivers 11 thru 14 is coupled to voting tone encoders 15, 16, 17 and 18, respectively.

Referring to FIG. 2, there is illustrated the tone encoder 15. A squelch tone is generated by a source 27 and is applied to a switch 29. The receiver audio is coupled to audio switch 30. The switch 29 is normally closed providing a signal flow from the tone generator source 27 through the line driver 28 to one of the telephone lines 21. Each of the receivers 11 thru 14 includes a squelch system such as, for example, a noise squelch. The noise squelch is responsive to the presence of a carrier signal and hence quieting of the receiver for coupling the audio out of the receiver and is responsive to noise above a signal level indicating the removal of a carrier to squelch or turn off the receiver audio output. When the receiver is unsquelched, a control input from the receiver becomes active and opens the switch 29 and closes the normally open switch 30. The signal flow in this mode is from the receiver audio output through switch 30 and line driver 28 to the telephone line 21. The tone from generator source 27 is used to indicate the lack of a signal present at that receiver site so that the receiver selective system 25 can differentiate between a quieted receiver and a faulty audio path. The tone encoders 16 thru 18 are identical to tone encoder 15 described above with the squelch control signal in each of the receivers 12 thru 14 determining the switched condition of the encoder 16 thru 18.

The receiver selective system 25 in this example includes four comparator modules 31, 32, 33 and 34, and a control module 35, FIG. 1. A comparator module is coupled to each one of the receivers 11 thru 14 via tone encoders 15 thru 18 respectively. Comparator module 31 is coupled via line 21 to receiver 11 and encoder 15; comparator module 32 is coupled via line 22 to receiver 12 and encoder 16; comparator module 33 is coupled via line 23 to receiver 13 and encoder 17; and comparator module 34 is coupled via line 24 to receiver 14 and encoder 18. The receiver selecting system 25 selects the best quality signal from the four receivers and provides only one output which is referred to as the voted audio output.

Referring to FIG. 3, there is illustrated a block diagram of the receiver selecting system 25. As mentioned previously, the receiver selecting system 25 comprises identical comparator modules 31, 32, 33 and 34. Since these comparator modules are identical, only module 31 is illustrated in detail. The input signals from receiver 11 at site 1, for example, are coupled via line 21 to the input and audio buffer 41. The output from audio buffer 41 is coupled to a S/N (signal-to-noise) quality evaluator 43, a tone detector 45 and a voted audio switch 46. The tone detector 45 includes a filter selected to pass the encoded signal from encoder 15. The tone detector 45 provides a high or logic "one" level signal when a tone is detected and a low or logic "zero" level signal without the received tone.

The basis for evaluating the audio quality at the S/N quality evaluator 43 is that of determining the ratio of the speech peak to the intersyllabic noise ratio. When there is no signal, this ratio is zero. As the signal quality improves, the ratio increases. The particular S/N quality evaluator 43 described provides an output level that decreases with improved signal quality or greater ratio of speech peak to noise signal without the received tone. The S/N quality evaluator 43 preferred will be discussed in more detail in a subsequent paragraph in the specification. The output from the S/N quality evaluator 43 is coupled thru S/N enhancement 48 to comparator 50. Comparator 50 may be, for example, an operational amplifier with an open feedback loop. The output from enhancement 48 is coupled to the non-inverting input of comparator 50. The S/N enhancement circuit 48 will be discussed in more detail in a subsequent paragraph. The S/N enhancement is normally inactive and in the inactive state only passes signals to the comparator. The enhancement when activated serves to enhance the signal applied to the comparator so the system will favor that module. The output of the S/N quality evaluator 43 is also coupled to a modulation detector 51. The modulation detector 51 may be a simple diode and threshold circuit coupled to the output of the S/N evaluator 43 to detect the presence of a modulated audio frequency signal. The outputs from the tone detector 45 and the modulation detector 51 are coupled to a fault detector and timer 53. The fault detector and timer 53 is responsive to lack of a tone and the lack of any modulation (audio) for 1.5 seconds, for example, to generate a high (logic "one") level fault signal. The fault signal is indicative of a dead line. The output from fault detector and timer 53 is coupled to a voted audio switch control 55 and to selected output logic 61. An output from tone detector 45 is a second input to audio switch control 55. The high level fault signal to voted audio switch control 55 provides a de-energizing low to switch 46 disconnecting module 31. Audio switch control 55 is for example a NOR gate. The output from comparator 50 is coupled to input terminal S of latch 57. Latch 57 also has an input terminal R coupled to the output of a voting rate timer 73 to be described. Latch 57 provides either a high (logic "one") or a low (logic "zero") output level terminal at its output terminal $\bar{Q}$. The latch 57 is a flip-flop with input terminals S and R arranged to be responsive to a transition from high level to a low level at their inputs. When the input goes from a high to a low level from the comparator to terminal S, the latch 57 is set to provide a low from $\bar{Q}$ terminal. When the input to terminal R goes from a high to a low, the latch is reset to provide a high from $\bar{Q}$ terminal. The $\bar{Q}$ output terminal of flip-flop latch 57 is coupled to selected output logic 61 and priority logic 63. An output signal from the tone detector 45 is coupled to selected output logic 61.

The selected output logic 61 may, as illustrated in FIG. 4, include an OR gate 62 and a NOR gate 64. The output S of tone detector 45 and fault detector and timer 53 are coupled to NOR gate 64 via OR gate 62. Assuming there is no fault or tone, and consequently a low level (logic "zero") to NOR gate 64 at terminal 64a and Q is at a low level (logic "zero") as in the set position, a high (logic "one") level is provided out of selected output logic 61. If any or all of the inputs to NOR gate 64 become a high (logic "one") level, as when there is a fault, a detected tone, or $\bar{Q}$ is reset, a low (logic "zero") is provided out of NOR gate 64.

The output from a delay-off timer 67 and priority logic 63 provide other inputs to the audio switch control 55. The priority logic 63 is used to prevent the connection of more than one audio output out of the system at a time. The priority logic 63 is coupled to a bus 76 which is common to the priority logic in all of the modules. If priority logic 63 is the first to have a low at its input terminal when latch 57 is set (a low), a low level output to audio switch control 55 is provided. The first module to provide a low to the voted audio switch control 55 via lead 63a will also provide a high to the priority bus 76 and a high to delay off timer 67 via lead 63b. The high on the priority bus 76 is coupled to all of the other priority logics in the system. This provides a high from the other priority logics to its corresponding audio switch control causing blocking to all of the other received signals. The delay off timer 67 acts to maintain the audio switch 46 closed once voted to maintain reception when the system is revoting. Details of the priority logic 63 and delay off timer 67 will be described in subsequent paragraphs. As previously stated, the output from voted audio switch control 55 controls the audio at switch 46. When the $\bar{Q}$ terminal of latch 57 goes low first (logic "zero") with no tone, faults or any signal on the priority bus 76, control 55 provides a high level which causes switch 46 to change state (close), and couple the audio present to the audio processor 71 in the control module 35. Voted audio control 55 is for example a NOR gate. All of the comparator modules 31, 32, 33 and 34 are coupled in the same manner to the same audio processor 71 in the control module 35.

Control module 35 includes a voting rate timer 73, and ramp generator 75. The input of voting rate timer 73 is coupled to the output of the selected output logic 61 of comparator module 31 and to the output of the selected output logic of each of the comparator modules 32, 33 and 34 via bus 74. The voting rate timer 73 provides a high level output for about 50 milliseconds after there is received via bus 74 a high level signal from a selected output logic such as logic 61 in module 31. After the 50 millisecond time period, the output from the voltage rate timer 73 provides a low level signal to the R terminal of latch 57 which causes latch 57 to be reset to provide a high at the $\overline{Q}$ output terminal at the time the transition occurs from a high to a low. The ramp generator 75 provides a low during the time period when there is a high from the voting rate timer 73. When the voting rate timer goes low (after 50 millisecond period) the generator 75 provides a signal that climbs toward $+V_{TH}$ at a rate of approximately 1 volt per millisecond. During the 50 millisecond time period, the timer 73 provides a high at its output and the voltage from the comparators is high (eg. comparator 50 output is high for example) since the output from the ramp generator 75 is held low. The low output from the ramp generator 75 is coupled to the inverting input of the comparators and is lower than the received signal coupled at the non-inverting input of the comparator. At the end of the 50 millisecond time period when the ramp signal equals the signal from the S/N enhancement (for example enhancement 48), the output from the comparator goes low (comparator 50 for example goes low) and this is coupled to the S terminal of latch 57 providing a low at the $\overline{Q}$ terminal.

Figure 5:
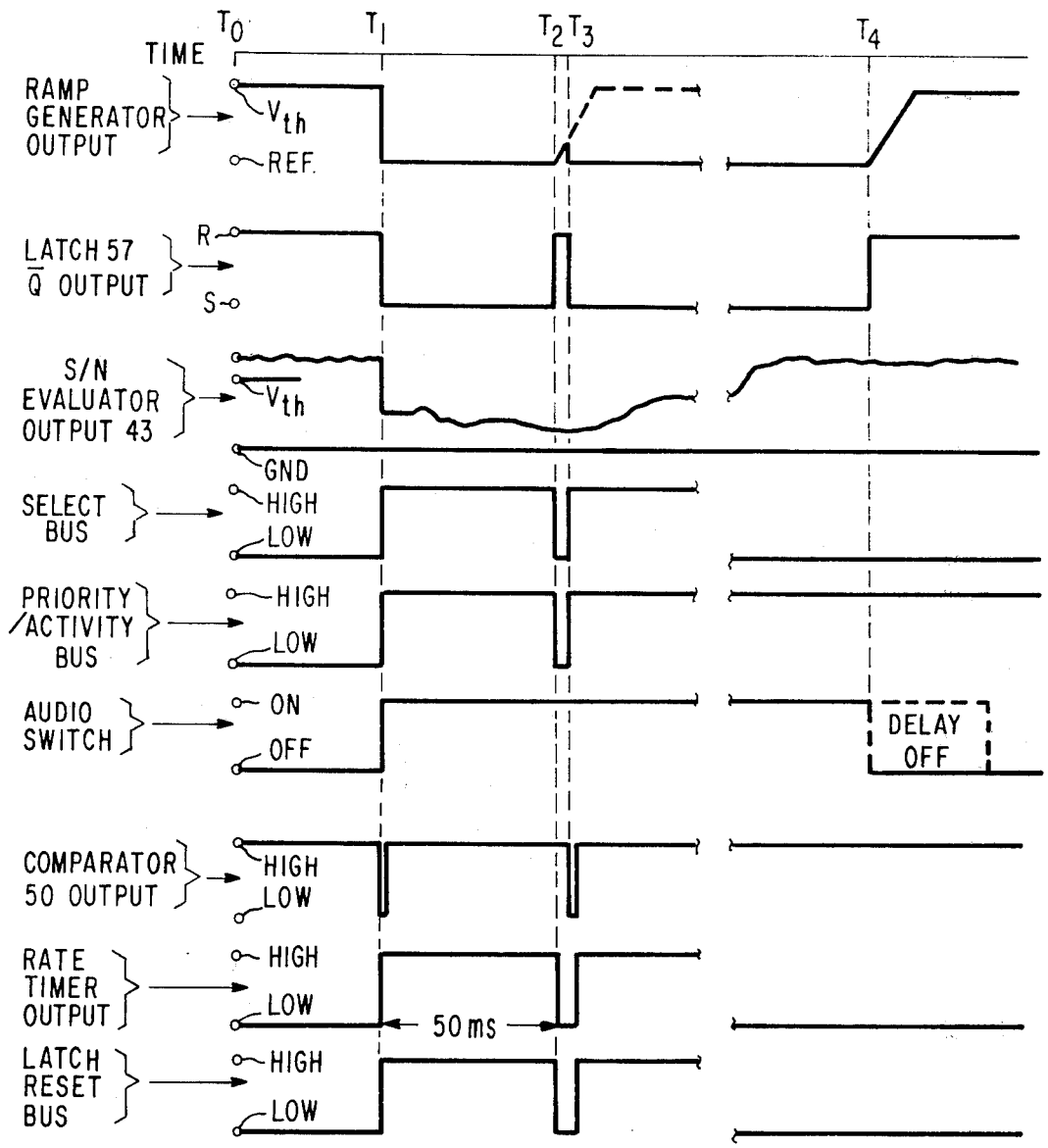
FIG. 5 is a timing diagram of the system of FIG. 3.

The operation of the selecting system follows in conjunction with the timing diagram in FIG. 5. During the time period $T_0$ to $T_1$, a squelch tone is being received at all of the comparator modules 31 thru 34. In this condition, the output from each of the tone detectors (such as tone detector 45) provides a high level signal to the voted audio switch control such as control 55 to provide a low or open condition to all of the audio switches (such as switch 46). The S/N quality evaluator 43 and the evaluator in each of the modules has an output which is greater than the threshold voltage $V_{TH}$. The ramp generator also provides the threshold voltage $V_{TH}$ during non-voting periods such as $T_0$ to $T_1$ by limiting the maximum output voltage by a Zener diode. The latch 57 and the latches in the other modules are in the R or reset condition and provide for example a high at the $\overline{Q}$ output of module 31. The output from selected logic 61 provides a low such that the entire select logic bus is at a low. The priority bus is also at a low and the comparator output is at a logic high position.

Assume, for example, that receiver 11 is the first receiver at time $T_1$ to be unsquelched, the output of the S/N quality evaluator 43 goes toward ground, the actual level depending on the audio quality. When the output of the S/N enhancement circuit 43 at the noninverting input of the comparator 50 goes below the threshold voltage $V_{TH}$ at the inverting input of the comparator, the comparator 50 output changes state and the normally high level output of the comparator becomes a low level output which causes the latch 57 to be set. Setting the latch 57 will generate a low level at the high $\overline{Q}$ output. The low level at the $\overline{Q}$ terminal of latch 57 causes a high to be provided to the selected bus 74 from selected logic output 61, a high on priority bus 76, a low from the priority logic 63 to voted audio switch control 55 and a high to the delay off timer 67. The low at the voted audio switch control 55 causes a high output from switch control 55 which closes switch 46 to permit the output from the receiver 11 to be coupled to the audio processor 71 and voted audio out of the system. This high level output is provided from the switch control 55 provided there is no longer a detected tone or no fault detection or previous signal sensed on the priority bus 76. When the switch control 55 is providing a high level output signal to switch 46 an enhancement control signal is coupled to S/N enhancement 48 and the apparent S/N ratio is enhanced by 3 db for example by the S/N enhancement circuit 48. The high level from the selected output logic 61 provides a high level to the selected bus 74 and to the voting rate timer 73. The voting rate timer 73 in response to this high on the selected bus provides for 50 milliseconds a high to ramp generator 75 and a high to reset terminal R of latch 57. The high from the voting rate timer 73 causes a low at the output from the ramp generator 75 which in turn causes the comparator 50 output to go high since the non-inverted input is more positive than the inverting input.

At the end of the voting rate timer period $T_2$, the output from the voting rate timer goes to a low level which causes the latch reset bus 72 to go low which, in turn, resets the latch 57. Resetting the latch 57 provides a high at the $\overline{Q}$ output. This high at the $\overline{Q}$ output causes both the output of the selected output logic 61 and the priority logic 63 to go low. This low is coupled to the selected bus 74 and the priority bus 76. Also in response to the low condition from the output of the voltage rate timer 73, the ramp generator 75 provides a signal which climbs toward threshold voltage $V_{TH}$ at a rate of approximately 1 volt per millisecond. When the ramp voltage at the inverting input to the comparator 50 for example exceeds the enhanced S/N quality voltage from S/N evaluator 43, the comparator 50 output goes low as shown at time $T_3$ in FIG. 5. As stated previously, when the output of the comparator 50 goes low, latch 57 is switched to the set position which will generate a low at the $\overline{Q}$ output which will provide a high to the selected bus 74 and priority bus 76. The low from $\overline{Q}$ output will provide a low from priority logic 63 to control 55 to the voted audio switch 46 to couple the received signal at module 31 to audio processor 71. The previously described sequence between time $T_1$ and $T_3$ repeats and continues to repeat with a ramp signal generated after every voting rate time period until either a squelch tone is received or modulation is no longer present. Although an enhancement is provided to each module which had been previously selected, any of the modules may become the selected one when its quality is greater than the enhanced quality of the previously selected module as measured during the time period of the ramp generation.

In the case where either a squelch tone is received or modulation is no longer present on the incoming audio as indicated in time $T_4$, the output from a S/N quality evaluator 43 or S/N enhancement 48 is greater than $V_{TH}$. In this case, the comparator 50 output does not change state and the voting sequence is not initiated. Note that during the time period $T_2$ and $T_3$, the select and priority bus are both low and the voted audio switch 46 is held on by delay off timer 67. This allows any of the comparator modules to be selected at the sample period, provided the S/N ratio is more than 3 db better than the S/N of the previously selected module. The priority circuit is used to prevent the connection of more than one audio output to the voted audio output at a time. The comparator module selected will place a high on the priority bus, thus preventing the selection of any other modules until the next sample period.

Referring to FIG. 6, there is illustrated in more detail, the S/N quality evaluator 43. A signal, for example, at the input to the S/N quality evaluator 43 includes the modulation signal level and the level during pauses in speech between words, sentences and syllables. The level of noise during these speech pauses is dependent upon the received carrier strength. Since the signal level at the receiver output is a function of the frequency deviation of the input signal and the noise floor during speech pauses is dependent upon the received carrier strength, the magnitude of the noise floor has been used during the speech pauses as a measure of the receiver output signal-to-noise ratio. If, however, a change in the gain (or loss) of any of the interconnecting paths occurs so that the absolute value of the signal appearing at the input to the selector changes, an erroneous selection can be made when the selection is based on noise floor alone. In the S/N quality evaluator 43, the best quality audio is selected on the basis of the ratio of speech peaks to the intersyllable noise floor. The speech input $E_{in}$ represented by signal 80 in FIG. 6 includes a voltage peak $e_p$ and voltage valley $e_v$. The voltage peak $e_p$ is indicative of the recovered modulation and its value in an FM system is dependent on the frequency deviation of the received input signal. The voltage valley $e_v$ is the level of the noise floor during speech pauses. The speech input $E_{in}$ is applied to a log amplifier 81. The logarithm of the input signal (LOG $E_{in}$) is coupled to and processed in envelope detector 83 to obtain signal 84 which is the envelope of the logarithm of the input signal. The envelope signal 84 is coupled to a peak detector 85 and a valley detector 86. The voltage at the output of the peak detector 85 is proportional to the logarithm of the speech peaks and the voltage at the output of the valley detector 86 is proportional to the logarithm of the noise floor voltage during the speech pauses. The speech peak detector 85 may include, for example, an RC time constant circuit at the output of an operational amplifier 90 whereby the envelope signal charges a capacitor 91, via a resistor 92 and a diode 93 with relatively low leakage current so that the capacitor essentially always stores the highest or peak voltage of the incoming signal over a time period of, for example, one second. The discharge path is provided via resistor 100 and part of the subtractor 88 which is an operational amplifier. The discharge time is 1 second with capacitor 91 being 1 microfard and resistor 100 being 1 megaohm. The valley detector 86 may include a circuit for discharging a capacitor 95 coupled to a supply voltage 96. The discharge circuit includes diode 97, resistor 99 and operational amplifier 98. Capacitor 95 recharges over a time period of about 4 seconds. The time periods that capacitor 91 holds its charge and it takes capacitor 95 to recharge is sufficient time for both speech modulation and speech pauses to occur. The detected peak level signal and the detected valley level signal are coupled to a subtractor 88. The subtractor 88 may be an operational amplifier, such as an RCA Corporation CA 3130, arranged in a standard substrate configuration with a bias supplied to the non-inverting input to force the output to +V when no modulation is present. The output from the peak detector 85, for example, is coupled to the inverting input terminal of the operational amplifier of the substractor, and the output from the valley detector 84 is coupled to the non-inverting terminal. Operational amplifier CA 3130 may be purchased from RCA Corporation, Somerville, N.J. Since the output voltage from the peak detector 83 is proportional to the logarithm of the speech peaks K (LOG $e_p$) and the output voltage from the valley detector 86 is proportional to the logarithm of the noise floor speech pauses K (LOG $e_v$), the output $E_o$ from the substractor is K (LOG$e_v$ − LOG$e_p$). Since the logarithm of the ratio of the two numbers is equal to the difference between the logarithm of the two numbers, the output from the evaluator 43 is equal to −KLOG$e_p/e_v$. It is noted that the negative sign in front of the term in the output voltage of the expression resulted in the way the peak and valley signals were coupled to the comparator and indicates that increasing signal-to-noise ratio results in a decrease in output signal level. This may be reversed in other systems.

As mentioned previously, the output from each of the S/N evaluator circuits is coupled via S/N enhancement such as enhancement 48 in FIG. 3 to each comparator. The S/N enhancement device allows artificial enhancement of the detected signal-to-noise ratio in a previously voted comparator module. This enhancement is to prevent switching between the receivers unless there is a significant improvement in signal-to-noise ratio. As mentioned previously, signal quality in the S/N evaluator in the herein described system is designed so that as the signal-to-noise ratio increases the output goes toward zero. Therefore, artificial enhancement is provided by reducing the voltage at the output of the S/N evaluator as illustrated in FIG. 7. The voltage $E_A$ in FIG. 7 is the output from the S/N evaluator as discussed above and $E_B$ is the enhanced output. As the S/N ratio increases as shown in FIG. 7, the voltage decreases toward ground potential. See curve X. The enhancement is accomplished by changing the ratio of a resistive voltage divider when the module is voted. Referring to FIG. 8, the voltage divider includes resistors 101, 102 and 103. Without enhancement, gate 104 is open and the output of the divider is:

$$\frac{(E_{in})(R_{102})}{R_{102} + R_{103}}$$

where $R_{102}$ equals the resistance of resistor 102 and $R_{103}$ equals the resistance of resistor 103.

With enhancement gate 104 closed, the output is, $$\frac{(E_{in})(R_p)}{R_{101} + R_p} \text{ where } R_p = \frac{(R_{102})(R_{103})}{R_{102} + R_{103}}$$

and $R_{101}$ equals the resistance of resistor 101 and $$R_{103} = \left(\frac{\beta}{1-\beta}\right)\frac{(R_{101})(R_{102})}{R_{101} + R_{103}} \text{ where}$$

$$\beta = \frac{\text{output with enhancement}}{\text{output without enhancement}}$$

Since the input to the enhancement circuit is the log of the speech peak to noise floor ratio, the enhanced output has a logarithmic relation to the input noise floor. Thus, anytime gate 104 is closed (switch closed), the output represents a constant (in terms of decibel)

improvement in the input S/N ratio regardless of the actual value of the original S/N ratio. The closing of gate 104 is responsive to an output signal from voted audio switch control such as control 55 in module 31 of FIG. 3. This closing of gate 104 is an equivalent of a reduction in the input noise level. When the gate 104 is closed, the voltage decreases further toward ground as illustrated in curve Y of FIG. 7. For our specific embodiment to provide 3 db improvement $R_{101}$ is 10 ohms, $R_{102}$ is 100 ohms, and $R_{103}$ is 20 ohms.

It is desirable to prevent multiple voting where two or more signals have about the same S/N ratio. According to the priority logic 63, the first to achieve a vote inhibits all the others from voting. The delay off timer 67 holds the vote until the system is set up to revote. As mentioned previously, the output from each priority logic is coupled to priority bus 76. When a comparator module is selected a high is provided from the priority circuit of the selected comparator module to the priority bus. A sensed high on the priority bus 76 (for example from logic 63 in FIG. 3) inhibits all of the other modules from voting. Referring to FIG. 9, there is illustrated a diagram of the priority system. The priority system of each module includes the priority logic (such as logic 63 in FIG. 3) and a delay off timer such as delay off timer 67. NOR gate 55a is part of voted audio switch control 55. The priority logic 63 includes three NOR gates 110, 111, and 113 and diode 115. One input terminal of NOR gate 110 is coupled to $\overline{Q}$ terminal of latch 57. The output of NOR gate 110 is coupled to delay off timer 67, one terminal of NOR gate 113 and the anode of diode 115. The cathode of diode 115 is coupled to the priority bus 76 and to both input terminals of NOR gate 111. The output of NOR gate 111 is the second input to NOR gate 113. The output from NOR gate 113 is applied to NOR gate 110 and is applied to NOR gate 55a of voted audio switch control 55. Delay off timer 67 comprises a diode 117, an RC time circuit of capacitor 119 and resistor 121 in parallel, and NOR gate 125. The output from NOR gate 110 is coupled to the anode of diode 117 and the cathode of diode 117 is coupled to resistor 121 and capacitor 119 and to the NOR gate 125. The output of NOR gate 125 is applied as a second input to NOR gate 55a. When the output from gate 110 is high, gate 125 immediately provides a low and capacitor 119 charges. When latch 57 is reset to a high to begin voting, the previously voted module stays "on" until a new vote has been coupled by maintaining a low out of NOR gate 125 for the discharge time of capacitor 119 through resistor 121.

The operation of the above described priority subsystem will be described with the aid of the following table where the symbols in the table are shown in FIG. 9:

| $\overline{Q}$ | A | P | B | C | V | |
|---|---|---|---|---|---|---|
| 1 | 0 | 0 | 1 | 0 | 0 | - no activity |
| 1 | 0 | 1 | 0 | 1 | 0 | - External Activity - no internal activity |
| 0 | 1 | 1 | 0 | 0 | 1 | - Internal Activity first |
| 0 | 0 | 1 | 0 | 1 | 0 | - External activity prior to internal activity | where $\overline{Q}$ is the output from latch 57, A is the output from gate 110, P is the level on the priority bus. B is the output of gate 111, C is the output of gate 113, and V is the output of gate 55a. Logic symbol 1 refers to a high or logic "one" level signal and logic symbol 0 indicates a low or logic "zero" level signal.

When there is no activity detected in the module or other modules, the output P on the priority bus is low. When Q is high during voting the output A of gate 110 is low. The output B from gate 111 is high since P is low and the output C from gate 113 is low since B is high. Since the output A is low, NOR gate 125 provides a high to gate 55a and consequently a low at point V.

When there is no internal activity detected in the module but there is a voted condition in one of the other modules, the signal level on the priority bus is high. This high at P causes gate 111 to provide a low at point B. Since the output of gate 110 is low when Q is high and point B is low, the output of gate 113 (point C) is high. The output of gates 110 and gate 55a is blocked from further activity and the voltage at V is low.

If the module containing this priority circuit is the first to achieve activity, latch 57 is the first to go low when the voltage at point P on the priority bus is low. Since P is low, the output B of gate 111 is initially high providing a low at C to gate 110. Since Q provides a second low to gate 110, a high is provided at point A to diodes 115 and 117. A high at diode 115 provides a high on the priority bus. A high at diode 117 provides immediately a high to NOR gate 125 causing an immediate low to gate 55a. The high at point A causes capacitor 119 to charge. Since point C is already at a low, gate 55a is gated to provide a high at point V to couple signals at that receiver associated with this module to audio processor 71. The output at C from gate 113 stays low since the level at point A is high.

When latch 57 is reset during the sample period by timer 73 and $\overline{Q}$ goes to a high, point A goes low, point P goes low, point C goes low and since capacitor 119 is charged the output of gate 125 stays low for the time period such as 25 to 50 milliseconds it takes capacitor 119 to discharge through resistor 121 to the threshold level of gate 125. If this occurs before there is a newly received transmission, the gate 55a is gated "off" via a high from gate 125. It is assumed that during normal conversations, a signal is detected in the comparator of one of the modules before capacitor 119 is sufficiently discharged to gate "off" gate 55a. This time off timer functions with the discharge time of capacitor 119 to prevent revoting until the system is set up to revote.

If the module becomes active shortly after another module has become active, P is already high before $\overline{Q}$ goes low. When P is high, B goes low. $\overline{Q}$ is first high providing a low at point A and a high at point C. When $\overline{Q}$ goes low, point A stays low with point C staying high. Gate 110 and 55a stay blocked keeping a low at points A and V.

What is claimed is:

1. In a system for selecting a signal from a plurality of signals, a separate signal quality detector being respectively responsive to each of said signals for providing a level signal indicative of signal quality, a separate selection gate being responsive to each of said signals with the outputs of said gates being connected in common to a utilization circuit, and means connected to each of said quality detectors responsive to said level signals for providing a control signal to the selection gate corresponding to the quality detector responsive to the best quality signal to cause that selection gate to couple the signal to which it is responsive to said utilization circuit, the improvement for preventing more than one signal being selected at a time comprising:

means responsive to said control signal being provided to any of said selection gates for providing an activity signal, said last mentioned means including further means coupled to each of said selection gates and responsive to said activity signal indicating that one of said selection gates has been operated to pass that one of said plurality of signals to which it is responsive to said utilization circuit to cause the remaining said selection gates to block the passage of the remaining signals of said plurality of signals to said utilization circuit, said further means being responsive to the absence of said activity signal to permit the first one of said selection gates thereafter having said control signal provided thereto to continue to pass to said utilization circuit the signal of said plurality of signals to which that last-mentioned one selection gate is responsive.

2. In a system as claimed in claim 1 and wherein said means responsive to said control signal is responsive to the termination of a signal then being passed by one of said selection gates or the degradation of the quality of that signal below a given value to permit the next selection gate having a control signal provided thereto to pass that one of said plurality of signals to which it is responsive while operating all other selection gates to block said remaining signals of said plurality of signals.

3. In a system as claimed in claim 1 and wherein said means responsive to said control signal includes a separate circuit means coupled to each of said selection gates, each circuit means being responsive to the provision of a control signal to its selection gate to forward an activity signal to the other circuit means and being responsive to an activity signal from another circuit means to prevent the operation of its selection gate in response to a control signal.

* * * * *

UNITED STATES PATENT OFFICE
CERTIFICATE OF CORRECTION

PATENT NO. : 4,057,761

DATED : November 8, 1977

INVENTOR(S) : Donald D. Harbert et al

It is certified that error appears in the above-identified patent and that said Letters Patent are hereby corrected as shown below:

In Column 4, line 33, "Q" should read -- $\bar{Q}$ --. Column 10, line 5, "Q" should read -- $\bar{Q}$ --; line 14, "Q" should read -- $\bar{Q}$ --; line 22, "Q" should read -- $\bar{Q}$ --.

Signed and Sealed this

Sixteenth Day of January 1979

[SEAL]

Attest:

RUTH C. MASON
*Attesting Officer*

DONALD W. BANNER
*Commissioner of Patents and Trademarks*